(12) United States Patent
Greenberg

(10) Patent No.: US 8,112,657 B2
(45) Date of Patent: Feb. 7, 2012

(54) METHOD, COMPUTER, AND COMPUTER PROGRAM PRODUCT FOR HARDWARE MAPPING

(75) Inventor: Stuart H. Greenberg, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 51 days.

(21) Appl. No.: 12/814,820

(22) Filed: Jun. 14, 2010

(65) Prior Publication Data

US 2011/0307735 A1    Dec. 15, 2011

(51) Int. Cl.
*G06F 11/00* (2006.01)

(52) U.S. Cl. ............ 714/3; 714/4.1; 714/4.11; 714/4.2; 714/26; 709/221

(58) Field of Classification Search ............... 714/3, 4.1, 714/4.11, 4.2, 26; 709/221
See application file for complete search history.

(56) References Cited

U.S. PATENT DOCUMENTS

| | | | | |
|---|---|---|---|---|
| 7,213,022 | B2 * | 5/2007 | Whelan et al. | 707/610 |
| 7,519,857 | B2 * | 4/2009 | Anantharamaiah et al. | 714/13 |
| 7,609,619 | B2 | 10/2009 | Naseh et al. | |
| 7,680,957 | B1 * | 3/2010 | Ketterhagen et al. | 709/246 |
| 8,010,676 | B1 * | 8/2011 | Battersby et al. | 709/226 |
| 2005/0193245 | A1 * | 9/2005 | Hayden et al. | 714/13 |
| 2007/0250738 | A1 * | 10/2007 | Phan | 714/6 |
| 2008/0209258 | A1 * | 8/2008 | Casale et al. | 714/4 |
| 2009/0113233 | A1 * | 4/2009 | Phan | 714/4 |
| 2009/0307166 | A1 * | 12/2009 | Routray et al. | 706/46 |

OTHER PUBLICATIONS

Sungard, "Strategies for Tiering Applications and Data to Maximize Availability", Copyright 2010 SunGard Availabity Services LP.; pp. 1-6; Wayne, PA USA; retrieved from www.availability.sungard.com.
Sungard, "Key Considerations for Disaster Recovery Planning", Copyright 2009 SunGard Availability Services LP., Wayne, PA USA; pp. 1-12; retrieved from www.availability.sungard.com.

* cited by examiner

*Primary Examiner* — Charles Ehne
(74) *Attorney, Agent, or Firm* — Cantor Colburn LLP

(57) ABSTRACT

A method is provided for mapping a data center to a disaster recovery site. Data center information including production hardware and production applications is retrieved from a database. Disaster recovery site information including disaster recovery hardware is retrieved from the database. A list is created of the production applications and a valid list of the production applications is automatically determined from the list based on rules in the database. A list is created of the production hardware, and a valid list of the production hardware is automatically determined from the list based on the rules in the database, which includes determining the production hardware on which the valid list of the production applications run, and removing the production hardware on which the valid list of the production applications does not run. The valid list of the production hardware is mapped to the disaster recovery hardware of the disaster recovery site.

20 Claims, 8 Drawing Sheets

FIG. 3A: Parameters And Rules

| | |
|---|---|
| Map In-Scope Applications Only | Business applications are classified in advance as 'in-scope' or 'out-of-scope' for IT disaster recovery requirements. Normally, only in-scope applications are included in hardware mapping |
| Map Only These Priorities | Applications are assigned recovery priorities based on the criticality of the business process(es) they support. This priority affects the order of the mapping and therefore the availability of servers in the recovery pool. |
| Do Not Map these Test Types | If the application has been architected with automatic failover, they do not (normally) require hardware allocations from the recovery pool and are excluded from hardware mapping. In addition, certain applications have either dedicated DR hardware in the Recovery Center and/or have Test & Development equipment that is to be used in a disaster event and, therefore are exempted from the hardware mapping process. |
| Do Not Map these Recovery Types | Recovery Types identify the recovery methodology, from Automatic Failover, use of T&D equipment and/or to recovery at time of disaster. Normally, as with the test-types, applications with failover and dedicated DR hardware are not hardware mapped. |
| Do Not Map if Exercise Deferral Exists | Applications can seek and be awarded a temporary deferral from testing. These applications are passed over during the application selection process (i.e., not in the valid applications list) and are not hardware mapped. |
| Do Not Map Servers in these Recovery Location Types | Certain business (e.g., AT&T®) applications are supported by external DR companies and, therefore are excluded from the mapping process. |
| Map Using History First | The mapping tool collects mapping history so that what has been mapped in the past can be reused; thus eliminating the need to run the mapping tool for this hardware/application. The mapping tool does validate that the production hardware and the recovery hardware are still compatible. |

125

FIG. 3B: Parameters And Rules

| | |
|---|---|
| Gap All Servers if All Servers cannot be mapped | This rule controls how complete the mapping is for a particular application. The mapping tool can map all the servers that can be mapped and mark the rest as "gap". However, the mapping tool has the flexibility to mark the Mapped servers as "mappable" and put the recovery hardware back into the DR server pool. This lets users know which apps can be "partially" mapped. |
| Only Map the 1st Citrix® Server | In the business (e.g., AT&T®) environment, some applications configure 10, 20 and even 30 Citrix® servers. When mapping for a test, normally only one of these servers is needed to perform the test thereby freeing up more of the DR server pool. |
| Only Map the Applications Given | As noted above, users can supply a list of applications that need to be mapped either in a single data center or across all business major data centers. |
| Do Not Include these Applications | There are a few applications that are never mapped. This parameter allows the mapping tool to bypass these applications during the initial application selection process. |
| Reset Pool After Each Application | There are times when management wants to analyze if a single application can be totally mapped without competing for resources. This parameter tells the mapping tool to reset the DR pool after each application is processed. |
| Reset Pool After Each Location | The mapping tool can map a set of applications across multiple data centers to see how the mapping compares from data center to data center. |
| Inherent Business Rules | All applications must be in "production" status. All servers must be in "production" status. Server Model numbers must be valid and known to the mapping tool. The server must be a midrange server, i.e., not a mainframe. There must be identifiable servers for an application. |

| Run Sequence Number | 19 |
|---|---|
| Map Run Name | Sanders Street |
| Requested By | sg9999 |
| Rerun Mapping Only | No |
| Data Center Address | 2305 Sanders Street, AL |
| MOTS Location Codes | 42/ (internal code) |
| Map In-Scope Apps Only | Yes |
| Map Only These Priorities | 0,1,2,3,4,5,9 |
| Do Not Map these Test Types | Failover |
| Do Not Map these Recovery Types | 2A, 2B, 1A, 1B |
| Do Not Map if Exercise Deferral Exists | Yes |
| Add Uninstalled Hardware to DR Pool | No |
| Map Using History First | No |
| Gap All Servers if All Servers cannot be Mapped | Yes |
| Only Map the 1st Citrix Server | Yes |
| Only Map the Applications Given | No |
| Mapping was on | 4/8/2010 |
| Do Not Include these Applications | 8705, 9237, 4567, 3345, 3235 |

FIG. 5

Mapping Summary

| | |
|---|---|
| Total Applications Processed: | 71 |
| Total Servers Processed: | 61 |
| Gapped Servers | 29 |
| Server Previously Mapped | 4 |
| Failed Application Rules | 57 |
| Mapped Servers | 14 |
| Mappable | 6 |
| Failed Server Rules | 12 |

500

METHOD, COMPUTER, AND COMPUTER PROGRAM PRODUCT FOR HARDWARE MAPPING

BACKGROUND

Exemplary embodiments relate to hardware mapping, and more particularly to, hardware mapping for data centers for disaster exercises and events.

A data center or datacenter is a facility used to house computer systems and associated components, such as telecommunications and storage systems. It generally includes redundant or backup power supplies, redundant data communications connections, environmental controls (e.g., air conditioning, fire suppression) and security devices. Data centers store business information and provide global access to the information and application software through a plurality of computer resources. Data centers may also include automated systems to monitor server activity, network traffic and performance. Data centers may be known by a variety of names such as, by way of example, a server farm, hosting facility, data farm, data warehouse, co-location facility, co-located server hosting facility, corporate data center, managed data centers, internet hotel, internet service provider, application service provider, full service provider, wireless application service provider or other data network facility. Regardless of the name used, a typical data center houses computer resources such as mainframe computers, web servers, application servers, file servers, and printer servers executing various operating systems and application software, storage subsystems and network infrastructure.

Since a data center can be very large, hardware mapping of a data center is a tedious process that forces an individual to access many different sources of data, and track all of this information that needs to be used in the mapping decision.

BRIEF SUMMARY

Exemplary embodiments include a method for mapping a data center to a disaster recovery site is provided. Data center information for the data center is retrieved from a database, and the data center information includes production hardware and production applications. Disaster recovery site information for the disaster recovery site is retrieved from the database, and the disaster recovery site information includes disaster recovery hardware. A list is created of the production applications in the data center. A valid list of the production applications is automatically determined from the list of the production applications based on the rules in the database. A list is created of the production hardware in the data center. A valid list of the production hardware is automatically determined from the list of production hardware based on the rules in the database, which includes determining the production hardware on which the valid list of the production applications run, and removing the production hardware on which the valid list of the production applications does not run. The valid list of the production hardware is mapped to the disaster recovery hardware of the disaster recovery site.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIGS. 3A and 3B illustrate parameters and rules that may be applied when hardware mapping a data center to the disaster recovery site in accordance with exemplary embodiments;

FIG. 4 illustrates a chart that depicts applying example parameters and rules when hardware mapping in accordance with exemplary embodiments;

FIG. 5 illustrates a mapping summary generated and displayed by a mapping tool in accordance with exemplary embodiments;

The detailed description explains exemplary embodiments, together with features, by way of example with reference to the drawings.

DETAILED DESCRIPTION OF EXEMPLARY EMBODIMENTS

Figure 1:
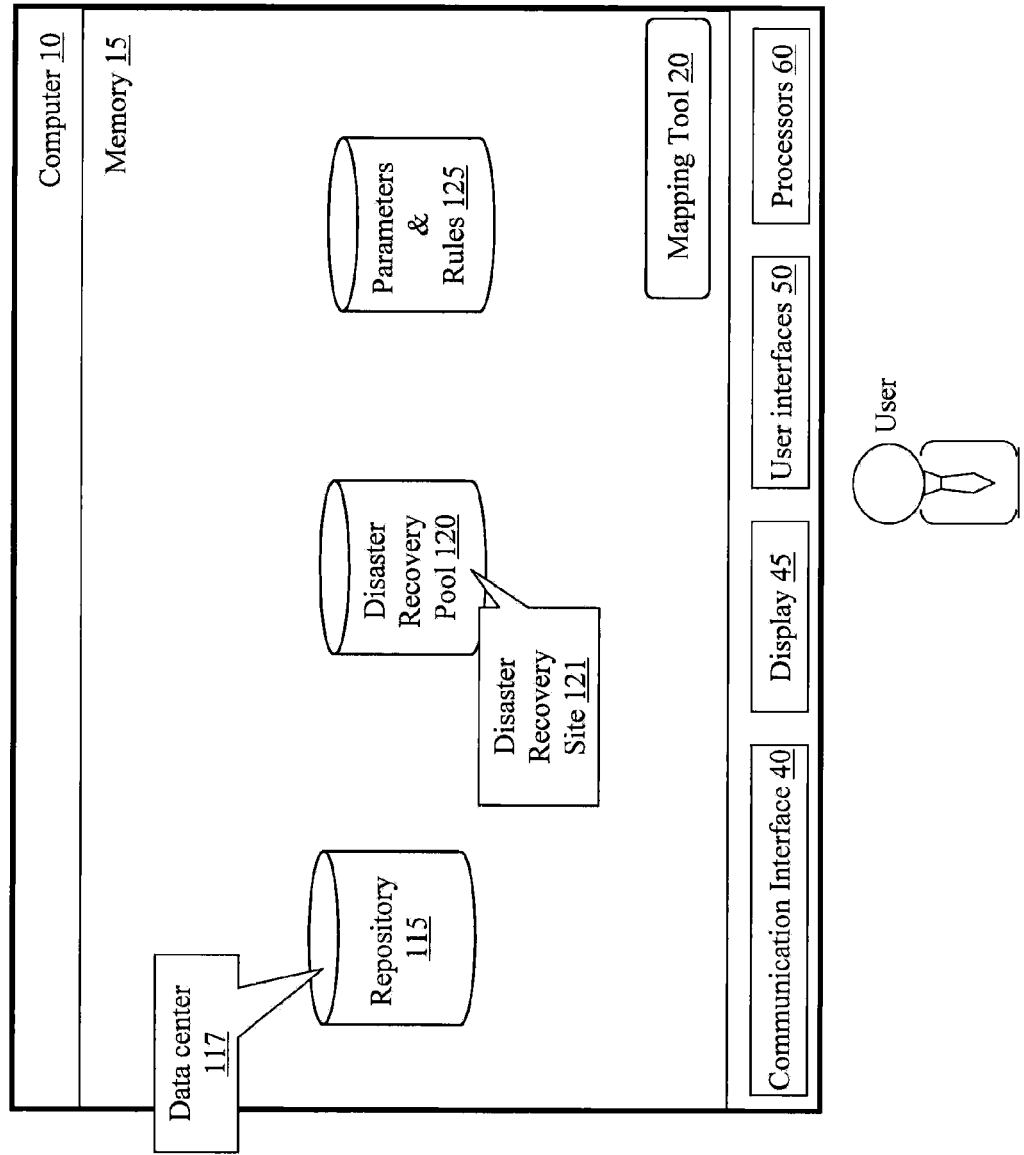
FIG. 1 illustrates a block diagram of a computer in accordance with exemplary embodiments.

FIG. 1 illustrates a block diagram 100 in accordance with exemplary embodiments. The diagram 100 depicts a computer 10 which may be one or more user devices distributed over a network or operatively connected to one or more servers over a network. The computer 10 may include and/or be coupled to memory 15, a communication interface 40, display 45, user interfaces 50, processors 60, and software 20. The communication interface 40 comprises hardware and software for communicating over the network. The user interfaces 50 may include, e.g., a track ball, mouse, pointing device, keyboard, etc, for interacting with the computer 10, such as inputting information, making selections, typing text or numbers, inputting commands, etc. The processors 60 are for processing computer executable instructions of exemplary embodiments.

The computer 10 includes memory 15 which may be a computer readable storage medium. One or more software applications such as the mapping tool 20 may reside on or be coupled to the memory 15, and the mapping tool 20 comprises logic and software components to operate and function in accordance with exemplary embodiments in the form of computer executable instructions. The mapping tool 20 may include a graphical user interface (GUI) in which the user can interact with. Although the mapping tool 20 is shown as a single element in FIG. 1 for conciseness, the mapping tool 20 may represent numerous software components or modules according to exemplary embodiments. Additionally, any element of the computer 10 may be distributed across a network. The network may include circuit-switched and/or packet-switched technologies and devices, such as routers, switches, hubs, gateways, etc., for facilitating communications. The network may include IP networks. The network may include wireline and/or wireless components utilizing, e.g., IEEE 802.11 standards for providing over-the-air transmissions of communications.

The mapping tool 20 is configured to map production hardware in a data center to equivalent disaster recovery hardware in a disaster recovery center either "at time of disaster" (ATOD) and/or for integrated exercises which test the accuracy and viability of the specific disaster recovery (DR) plans created for each business application, such as billing applications, phone activation applications, Internet service activation applications, repair service applications, customer service applications, etc. Note that the terms "business applications" and "production applications" refer to applications running in the data center for a business entity, and the terms may be used interchangeably.

The mapping tool 20 is "application-centric" in that it is the affected production applications in a data center that drive the collection and mapping of supporting production hardware. For example, the user and/or the business entity can identify one or more production applications. The mapping tool 20 is configured to determine the supporting production hardware running the production applications and map the production hardware to disaster recovery hardware in the disaster recovery site. Also, the mapping tool 20 is configured to be web-based, e.g., utilizing the Microsoft®.NET platform, and utilizes tools for database development such as Oracle® Procedural Language/Structured Query Language (PL/SQL).

The computer 10 may include and/or be operatively coupled to a repository 115, which is a comprehensive database of information of various corporate databases, including data center 117, and a collection of all production applications and application information and production hardware and hardware information deployed throughout the various data centers of the enterprise. The repository 115 also includes the location and configuration of all production applications and production hardware in a data center, along with disaster recovery information. Although the repository 115 comprises information for various data centers, information regarding a particular data center 117 will be referred to for explanation purposes but it is understood that hardware mapping by the mapping tool 20 is not meant to be limited to a single data center. The data center 117 represents a facility in a particular location.

The computer 10 may include and/or be operatively coupled to a disaster recovery pool database 120. The disaster recovery pool database 120 includes all the disaster recovery applications and disaster recovery hardware at a disaster recovery site. For ease of explanation, the disaster recovery site 121 is illustrated to represent a facility containing hardware for recovering from a disaster, e.g., for recovering from a disaster at the data center 117. The mapping tool 120 is configured to map the production hardware at the data center 117 to recovery hardware at the disaster recovery site 121. For hardware mapping, the disaster recovery pool database 120 includes information regarding, e.g., potential recovery servers at the disaster recovery site 121, the models of the recovery servers which includes the model class and class details at the disaster recovery site 121, and equivalent server models to the recovery servers at the disaster recovery site 121. Furthermore, the disaster recovery pool databases 121 includes all the technical specifications for the recovery hardware of, e.g., the disaster recovery site 121, and the repository 115 includes all the technical specifications for the production hardware of, e.g., the data center 117.

The computer 10 may include and/or be operatively coupled to a parameters and rules database 125, which is a collection of user-defined rules and parameters for mapping production hardware in the data center 117 to recovery hardware in the disaster recovery site 121. For hardware mapping the data center 117, the parameters and rules database 125 includes, e.g., the minimum production servers required and configuration thresholds for each production server.

Although the repository 115, the disaster recovery pool database 120, and the parameters and rules database 125 are shown separately, they may be combined in a single database and/or integrated into one or more databases and distributed over a network.

Figure 2:
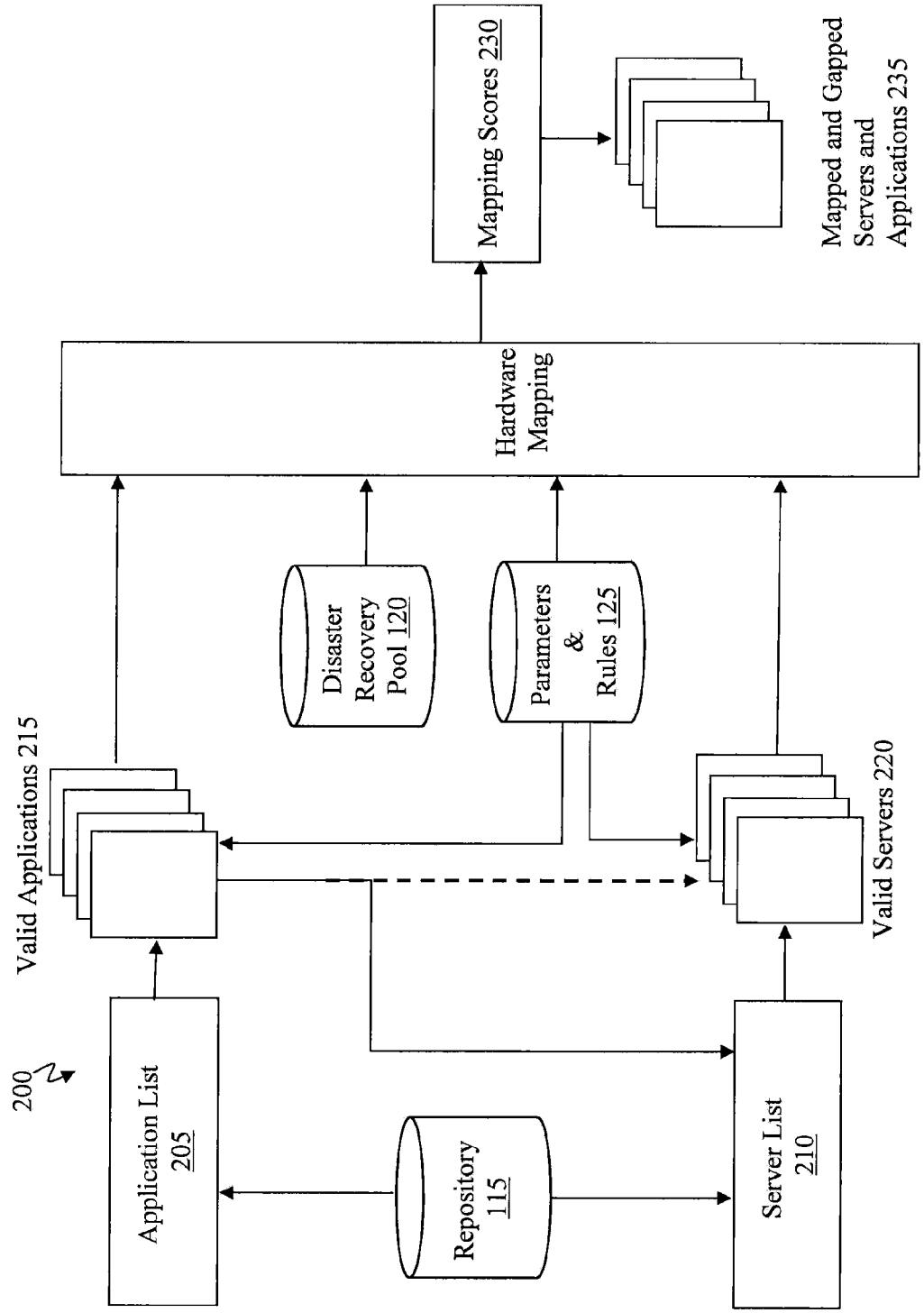
FIG. 2 illustrates a block diagram of hardware mapping by a mapping tool in accordance with exemplary embodiments.

Now with reference to FIG. 2, FIG. 2 illustrates a block diagram 200 of hardware mapping by the mapping tool 20 in accordance with exemplary embodiments. The user may input via the interface 50, such as a keyboard and mouse, the production applications in the data center 117 to be automatically mapped to recovery hardware in the recovery site 121.

The mapping tool 20 is configured to retrieve all the information about the data center 117 in the repository 115 for creating an application list 205. Production applications are gathered from the data center 117 being mapped and stored in the repository 115. The mapping tool 20 generates the application list 205 and/or the mapping tool 20 may import the application list 205 in a spreadsheet from the repository 115. To reduce the number of production applications in the application list 205 and/or to rank priority of the production applications in the application list 205, the mapping tool 20 is configured to filter the application list 205 by one or more criteria such as overall application priority which is the importance of the production application(s) as designated by the business entity. Also, the mapping tool 20 is configured to filter the application list 205 by the type of recovery and filter the application list 205 by excluded applications. Excluded applications are production applications designated by the business entity that should not be mapped by the mapping tool 20. The mapping tool 20 utilizes criteria in the parameters and rules database 125 for filtering the application list 205. The mapping tool 20 filters the application list 205 to create a valid applications list 215.

The mapping tool 20 is configured to retrieve all the information about the data center 117 in the repository 115 and to retrieve the valid applications list 215. Using this information, the mapping tool 20 determines the specific production servers on which the production applications run that are in the valid applications list 215 to generate a valid servers list 210. In one implementation, the mapping tool 20 collects servers for midrange systems, which are non-mainframe. Although servers are illustrated for explanation purposes, the present disclosure is not meant to be limited. Also, the mapping tool 20 filters the servers list 210 by criteria in the parameters and rules database 125 to generate the valid servers list 220.

By retrieving information about the disaster recovery site 121 from the disaster recovery pool database 120, production applications from the valid applications 215, criteria from the parameters and rules database 125, and production servers from the valid servers 220, the mapping tool 20 performs hardware mapping of the data center 117 to the disaster recovery pool database 120 for the disaster recovery site 121 in accordance with exemplary embodiments.

For example, when the mapping tool 20 maps production servers of the data center 117 to the recovery servers of the disaster recovery (DR) pool 120, i.e., recovery center hardware pool, the mapping tool 20 assigns recovery servers on a first-come, first-served basis based on the priority of the production application being supported. As an example, the mapping tool 20 constructs a list of potential disaster recovery servers based on the production server's model number. Not only are exact server model number matches collected, but equivalent server model numbers are also collected by the mapping table 20 to be included in the potential disaster recovery servers. As each disaster recovery server is examined by the mapping tool 20, a "mapping score" 230 is computed by the mapping tool 20 based on how well the recovery server matches the production server based on the model type, the number of central processing units (CPUs) also referred to as processors, the speed of those CPUs, and the amount of memory. For a single production server, there may be multiple potential recovery servers tentatively designated to this single production server, and each potential recovery server is assigned a mapping score 230. The mapping tool 20 sorts the list of potential recovery servers by the mapping score 230, and the highest scoring recovery server is chosen and removed as available from the disaster recovery pool database 120, i.e., the highest scoring recovery server may be marked unavailable. This process of selecting the highest scoring recovery server out of the potential disaster recovery servers that match a particular production server is continuously performed by the mapping tool 20 for each production server, until all production servers are mapped until the mapping tool 20 determines that the production server cannot be mapped to a recovery server, and/or until there are no more available recovery servers left.

Also, when mapping the production servers of the data center 117 to the disaster recovery servers in the disaster recovery pool 120, the mapping tool 20 is configured to consider and take into account minimum configurations and hardware thresholds stored in the user-defined parameters and rules database 125 for the data center 117. The mapping tool 20 allows the user and/or business entity to define a minimum configuration for the production servers of the data center 117. For example, there may be 15 production servers running in production at the data center 117 but in a disaster event and/or for testing, the parameters and rules indicate that only 10 recovery servers are needed. Accordingly, the mapping tool 20 uses this information to, e.g., only map to 10 recovery servers instead of normally mapping to 15 recovery servers. In addition, in the user-defined parameters and rules database 125, the user can specify a percentage of production CPUs of the production server, a percentage of the memory of the production server, and a percentage of the CPU speed of the production server, so that the mapping table 20 finds a matching recovery server that has the particular percentage of production CPUs, the particular percentage of the memory, and the particular percentage of the CPU speed without having to have the full amount. For example, the user/business can specify in the parameters and rules database that the recovery server can have 75% of the production server's memory (75% of the CPUs, 75% of the CPU speed, etc.) and be acceptable, and the mapping tool 20 accordingly maps to a recovery server that meets the given minimum configurations and hardware thresholds.

Further regarding the parameters and rules in the parameters and rules database 125, FIGS. 3A and 3B illustrate example parameters and rules of the database 125 that may be applied by the mapping logic of the mapping tool 20 when hardware mapping a data center such as the data center 117 to the disaster recovery site 121 in accordance with exemplary embodiments. It is understood that the example parameters and rules are not meant to be limiting and fewer or more parameters and rules may be applied by the mapping tool 20 in accordance with exemplary embodiments.

For the data center 117, the repository 115 includes whether the business applications are classified as "in-scope" or "out-of-scope" for IT disaster recovery requirements. Using the "in-scope" or "out-of-scope" criteria of the parameters and rules database 125, the mapping tool 20 is configured to perform hardware mapping for, e.g., only in-scope production applications which are designated in advance.

In response to the business entity assigning recovery priorities, such as 0, 1, 2, 3, 4, 5, etc., to business applications in the repository 115 for the data center 117, the mapping tool 20 may be configured to hardware map production servers from the lowest number to the highest number until the recovery servers are exhausted. The lowest number represents the highest priority and importance for the business applications. For example, the mapping tool 20 may first map production severs for business applications with priority "0", second map production servers for business applications with priority "1", third map production servers for business applications with priority "2", and so forth until there are no more recovery servers to map to. As such, the recovery servers would be assigned to production servers corresponding to the lowest number first representing the highest priority. Also, the mapping tool 20 can be configured to map only certain priorities and not other priorities, such as map priorities "0", "3", "4", and "5" but not priorities "1" and "2".

For the data center 117, there may be certain production applications identified in the repository 115 that have automatic failover in which their functionality and services are automatically duplicated, e.g., in another data center other than the production data center 117, and the mapping tool 20 is configured not to hardware map the production servers for these production applications. Also, certain production applications identified in the repository 115 for the data center 117 may have dedicated disaster recovery servers, e.g., predefined in advance, and the mapping tool 20 determines that no hardware mapping is needed for the production servers of these production applications already having dedicated disaster recovery servers predefined in advance. The mapping tool 20 is configured not to map production applications having recovery types with automatic failover, dedicated disaster recovery hardware, and test and development (T&D) equipment to recovery at time of disaster.

Some production applications can seek and be awarded a temporary deferral from testing, and these production applications are passed over by the mapping tool 20 during the application selection process. For example, they are not included in the application list 205 and/or the valid applications 215 and are not mapped.

In the parameters and rules database 125, certain business applications may be supported by external disaster recovery companies, and therefore, the mapping tool 20 is configured to exclude these externally supported business applications from the hardware mapping process.

The mapping tool 20 is configured to collect mapping history of each data center including the mapping of each production server to a recovery server, so that what has been mapped in the past can be reused. This eliminates the need to run the mapping tool 20 for already mapped production servers, and only newly installed production servers need to be mapped. For production servers shown to be previously mapped in the repository 115, the mapping tool 20 is configured to validate that the production hardware and the recovery hardware are still compatible and still exists.

The mapping tool 20 may be configured to gap all production servers if all production servers cannot be mapped, and this rule controls how complete the mapping is for a particular business application. The mapping tool 20 can map all the production servers that can be mapped and mark the rest as "gap". However, the mapping tool 20 has the flexibility to mark the mapped servers as "mappable" and put the recovery hardware back into the disaster recovery pool in the database 120. This lets users know which business applications can be "partially".

In a business environment, e.g., AT&T®, some business applications may configure 10, 20, and even 30 Citrix® servers and/or another type of production server. When mapping for a test, the mapping tool 20 may be designed to only map one of these particular production servers, e.g., Citrix® for the test, thereby freeing up more of the disaster recovery server pool in the database 120.

The mapping tool 20 may be configured to only map the production applications given, where users can supply a list of applications that need to be mapped either in a single data center and/or across all major data centers of the business entity.

In the parameters and rules database 125, there may be a few production applications identified that are never mapped, and this parameter allows the mapping tool 20 to bypass these production applications during the initial selection process, e.g., when creating the applications list 205 and/or the valid application 215.

Normally, when a production server is mapped to a particular recovery server, that recovery server is assigned and removed from the pool of available disaster recovery servers in the database 120 by the mapping tool 20. For the parameter "reset disaster recovery pool after mapping each production application", there may be times when the business entity wants to analyze if a single production application can be totally mapped without competing for disaster recovery resources; this parameter instructs the mapping tool 20 to reset the disaster recovery pool in the database 120 after each production application is mapped/processed.

The mapping tool 20 may be configured to reset the disaster recovery pool in the database 120 after each data center location such as the data center 117, which allows all the disaster recovery hardware to be available again. This allows the mapping tool 20 to map a set of production applications across multiple data centers to see how the hardware mapping compares from data center to data center.

During hardware mapping, the mapping tool 20 may apply one or more of the following rules: all applications must be in "production" status, all servers must be in "production" status, server model numbers must be valid and known to the mapping tool, the server must be a midrange server, i.e., not a mainframe, and/or there must be identifiable production server(s) for a production application. The term "production" refers to the state of the application whereby it is used to support the current day-to-day business. By way of contrast, other applications and servers are in "development" or used for "testing". Servers can be "installed" but not currently used by any business entity.

The mapping tool 20 is configured to generate various hardware mapping reports that list production applications and production servers that were mapped. The mapping tool 20 is configured to generate a gap report that lists production applications and production servers that had gaps and those that failed any of the mapping rules in the parameters and rules database 125. The mapping tool 20 is configured to further format, filter, and chart the map report and gap report as desired by the user.

The mapping tool 20 is configured to generate an additional report which maybe referred to as the "Table-Top" report. The "Table-Top" report includes production applications that cannot be tested because there are gaps in the required disaster recovery hardware, and the "Table-Top" lists production servers that need to be manually reviewed in a disaster recovery plan.

Now turning to an example report, FIG. 4 illustrates a chart 400 that depicts applying example parameters and rules of the parameters and rules database 125 when hardware mapping by the mapping tool 20 in accordance with exemplary embodiments. The parameters and rules may generally be referred to as rules. The mapping tool 20 is configured to generate and display the chart 400 on the display 45 to the user. The chart 400 is illustrated for examples purposes and not limitation.

In the chart 400, the run sequence number is an internal run-number, which can distinguish monthly runs stored in the repository 115. The map run name is the run name used to distinguish mapping runs and is user definable.

In the chart 400, the map "in-scope" applications only value is "Yes", so the mapping tool 20 only maps the production applications designated as in-scope applications.

As discussed herein, production applications have an assigned priority, where priority 0 is the highest priority or importance. Production applications are sorted by this priority prior to mapping their production hardware to recovery hardware in the disaster recovery pool database 120. In the chart 400, the mapping tool 20 is configured to only map production servers corresponding to production applications having priorities "0" "1", "2", "3", "4", "5", and "9".

In the repository 115, there may be production applications identified by an application identification, e.g., a unique application number. If the production application number, such as 8705, 9237, 4567, 3345, and/or 3235, of a production application is found by the mapping tool 20 in the do not include these application values, the mapping tool 20 is configured to exclude these production applications during hardware mapping.

Recovery types indicate the strategy used to recover a production application. In chart 400, 1A and 1B production applications are failover applications, and 2A and 2B are production applications that failover to their dedicated recovery hardware which is normally their test & development hardware that is not co-located in the production data center.

In FIG. 4, gap all servers is a special flag indicating that all production servers cannot be mapped for a particular production application. For example, if there cannot be a 100% mapping of all supporting production hardware for a production application, the mapping tool 20 marks all of the supporting production hardware as gapped; the production hardware that could have been mapped is marked as "mappable" so that the reader of the report can see the actual gaps versus the production hardware that was 'artificially' gapped.

FIG. 5 illustrates a sample report of a mapping summary 500 generated and displayed by the mapping tool 20 in accordance with exemplary embodiments. For example purposes, the mapping tool 20 displays on the display 45 that 71 applications were processed and 61 servers were processed of the data center 117. The mapping summary 500 displays that 14 production servers are mapped to disaster recovery hardware in the disaster recovery site 121 and 29 production servers are gapped because they were unable to be mapped to disaster recovery hardware at the disaster recovery site 121. The mapping tool 20 also displays that 4 production servers have been previously hardware mapped to the disaster recovery site 121, e.g., based on hardware mapping history in the repository 115. The mapping summary 500 displays how many production servers that failed server rules/parameters and how many production applications that failed application rules/parameters of the database 125.

Since the mapping tool 20 is designed to be application-centric, it can be appreciated that the mapping tool 20 provides the impact of disaster recovery outages from a business viewpoint, and can provide details about which types of business/production applications (such as such as billing applications, phone activation applications, Internet service activation applications, repair service applications, customer service applications, etc.) that will and/or will not be supported during a disaster recovery outage. This way, the business entity/company can view the impacts of disaster recovery outages from a business loss perspective and not just a raw computing context.

Figure 6:
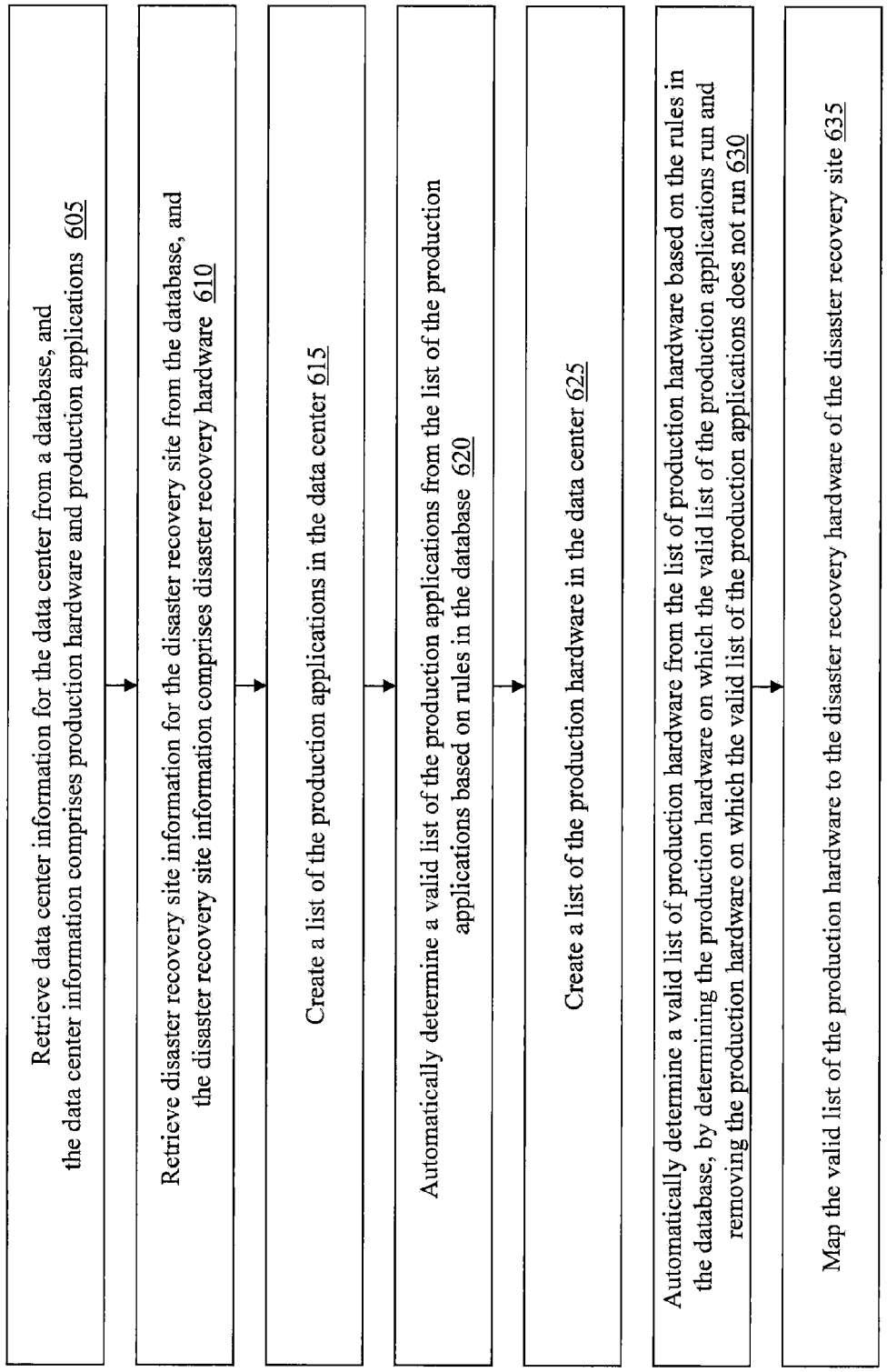
FIG. 6 illustrates a method in accordance with exemplary embodiments.

FIG. 6 illustrates a method 600 implemented by the mapping tool 20 for mapping production applications, i.e., business applications, and production hardware such as production servers in the data center 117 to the disaster recovery hardware such as recovery servers in the disaster recovery site 121 in accordance with exemplary embodiments.

At operation 605, the mapping tool 20 is configured to retrieve the data center information for the data center 117 from the repository 115, and the data center information comprises production hardware, production applications, and information/specifications about the production hardware.

At operation 610, the mapping tool 20 is configured to automatically retrieve disaster recovery site information for the disaster recovery site 121 from the disaster recovery pool in the database 120, and the disaster recovery site information comprises disaster recovery hardware that is available to be mapped to and information/specifications about the disaster recovery hardware.

At operation 615, the mapping tool 20 is configured to automatically create a list of the production applications, such as the applications list 205, in the data center 117 using, e.g., the data center information in the repository 115.

At operation 620, the mapping tool 20 is configured to automatically determine a valid list of the production applications, such as the valid applications 215, from the list of the production applications based on the rules in the repository 115 and/or in the parameters and rules database 125.

At operation 625, the mapping tool 20 is configured to automatically create a list of the production hardware, such as the server list 210, in the data center 117.

At operation 630, the mapping tool 20 is configured to automatically determine a valid list of the production hardware, such as the valid servers 220, from the list of production hardware based on the rules in the parameters and rules database 125. The mapping tool 20 determines the production hardware on which the valid list of the production applications run; this identifies, e.g., the production servers that are configured to run the production applications and the mapping tool 20 can know which production servers to map. Also, based on priority of the production applications, the mapping tool 20 knows which production servers to map first in the valid list of production hardware. The mapping tool 20 is configured to remove the production hardware on which the valid list of the production applications does not run which helps to reduce unnecessary mapping.

At operation 635, the mapping tool 20 is configured to map the production hardware, such as production servers, in the valid list of the production hardware to the disaster recovery hardware, e.g., recovery servers, of the disaster recovery site. For example, each individual production server is mapped to an individual disaster recovery server, until all the productions severs in the valid list are mapped, and/or until all the disaster recovery servers have been assigned to a production sever. When a selected disaster recovery server is mapped to, the mapping tool 20 removes the selected disaster recovery server from a pool of available disaster recovery hardware in the disaster recovery pool 120 such that the selected disaster recovery hardware is unavailable to be mapped to.

The mapping tool 20 is configured to determine an individual mapping score for each of the disaster recovery hardware in the potential group by, e.g., obtaining a model number for the piece of production hardware and constructing the potential group of disaster recovery hardware based on, e.g., the potential group matching the model number and/or based on the potential group having an equivalent to the model number. To compute the mapping score for each of the disaster recovery hardware which indicates how well each of the disaster recovery hardware matches the particular piece of production hardware, the mapping tool 20 determines a score for matching the model type of the piece of production hardware, determines a score for matching the number of central processing units (CPUs) of the piece of production hardware, determines a score for matching a speed of the central processing units of the piece of production hardware, and/or determines a score for matching an amount of memory of the piece of production hardware. When computing the mapping score for each of the disaster recovery hardware in the potential group, the mapping tool 20 is configured to give more weight for a piece of disaster recovery hardware in the potential group exactly matching the model number than for having the equivalent to the model number. The mapping tool 20 adds up the points for each potential disaster recovery hardware in the potential group, and the mapping tool 20 selects the disaster recovery hardware, e.g., disaster recovery server, out of the potential group that has the highest mapping score. The mapping tool 20 maps the piece of production hardware to the selected disaster recovery server, and the selected disaster recovery server is assigned.

The mapping tool 20 automatically determines the valid list of the production applications based on rules in the repository 115 and/or in the parameters and rules 125. The mapping tool 20 automatically removes the production applications that are not to be mapped and prioritizes the production applications to have a ranking order of importance in the valid list.

Figure 7:
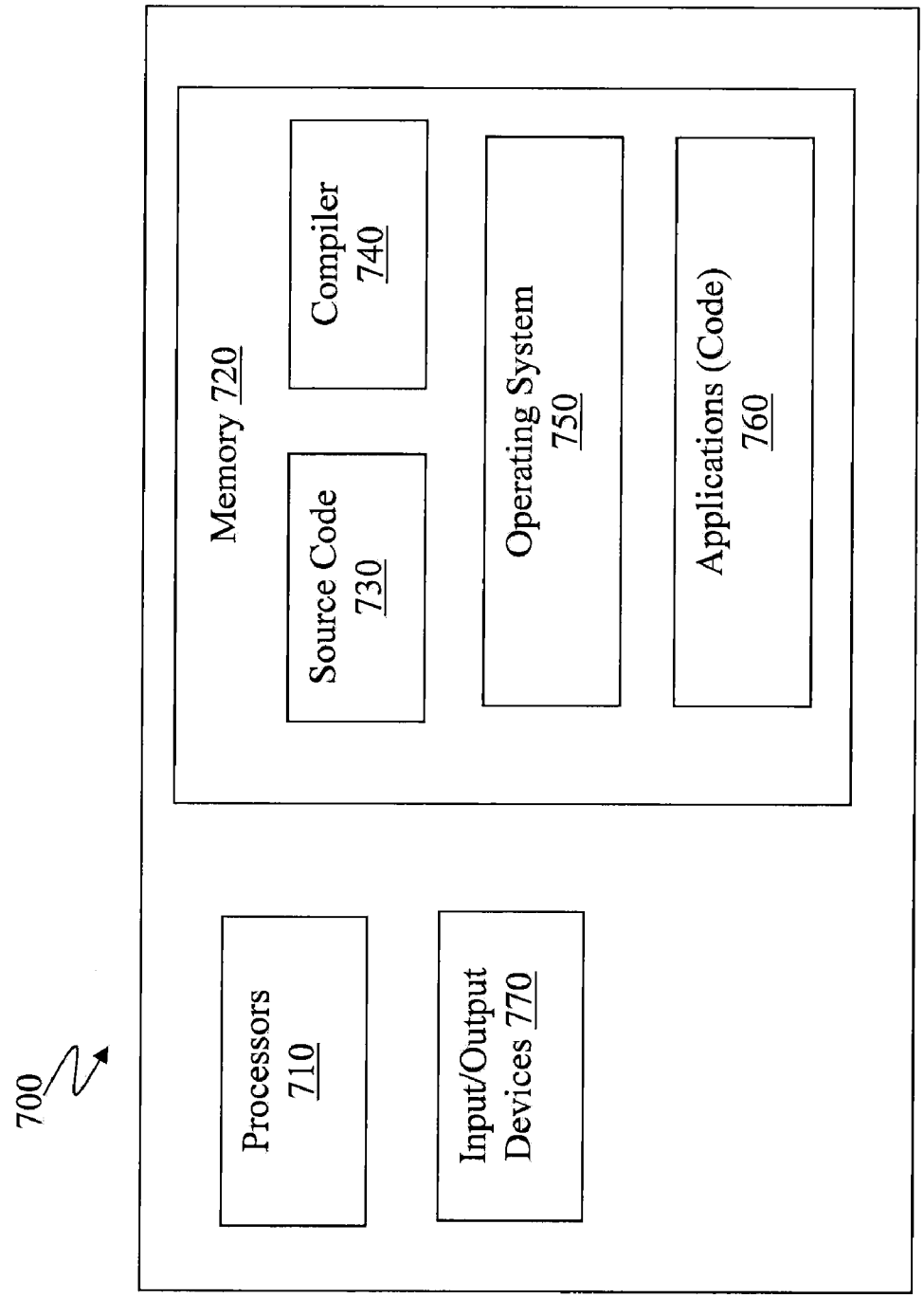
FIG. 7 illustrates a computer having elements utilized in exemplary embodiments.

FIG. 7 illustrates an example of a computer 700 that may be utilized in implementing exemplary embodiments. The computer 700 includes, but is not limited to, PCs, workstations, systems, laptops, PDAs, palm devices, tablets, servers, mobile devices, communication devices, cell phones, computer systems, set top boxes (STB), televisions (TV), game consoles, MP3 players, and the like. The computer 700 may include one or more processors 710, memory 720, and one or more input and/or output (I/O) 770 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in computer readable storage memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The computer readable storage memory 720 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the computer readable storage memory 720 may incorporate electronic, magnetic, optical, and/or other types of storage media. Note that the computer readable storage memory 720 can have a distributed architecture, where various components are situated remote from one another, but can be accessed by the processor 710.

The software in the computer readable storage memory 720 may include one or more separate programs, each of which comprises an ordered listing of executable instructions for implementing logical functions. In the example illustrated in FIG. 7, the software in the computer readable storage memory 720 includes a suitable operating system (O/S) 750, compiler 740, source code 730, and one or more applications 760 (or Modules) of the exemplary embodiments.

The operating system 750 controls the execution of other computer programs, and provides scheduling, input-output control, file and data management, memory management, and communication control and related services. It is contemplated by the inventors that the application 760 for implementing exemplary embodiments is applicable on all other commercially available operating systems.

The application 760 may be a source program, executable program (object code), script, or any other entity comprising a set of instructions to be performed. When a source program is to be executed, then the program is usually translated via a compiler (such as the compiler 740), assembler, interpreter, or the like, which may or may not be included within the computer readable storage memory 720, so as to operate properly in connection with the O/S 750. Furthermore, the application 760 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 770 may include input devices such as, for example but not limited to, a mouse, keyboard, scanner, microphone, remote controller, camera, biometric input device(s), a vibrator device for non-audible alert, etc. Furthermore, the I/O devices 770 may also include output devices, for example but not limited to, a printer, display, speaker, etc. Also, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 include may include modems, gateways, receivers, transmitters, transceivers, etc. for communicating over a communications network.

When the computer 700 is in operation, the processor 710 is configured to execute software stored within the computer readable storage memory 720, to communicate data to and from the memory 720, and to generally control operations of the computer 700 pursuant to the software. The application 760 and the 0/S 750 are read, in whole or in part, by the processor 710, perhaps buffered within the processor 710, and then executed.

When the application 760 is implemented in software, it should be noted that the application 760 can be stored on virtually any computer readable storage memory for use by or in connection with any computer related system or method. In the context of this document, a computer readable storage memory may be an electronic, magnetic, optical, or other physical device or means that can contain or store a computer program for use by or in connection with a computer related system or method.

The application 760 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable storage medium can be stored, communicated, propagated, or transported for use by or in connection with the instruction execution system, apparatus, or device.

More specific examples (a nonexhaustive list) of the computer-readable storage medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a computer readable storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While features have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof. Therefore, it is intended that the present disclosure not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for mapping a data center to a disaster recovery site, comprising:
    retrieving data center information for the data center from a database, the data center information comprising production hardware and production applications;
    retrieving disaster recovery site information for the disaster recovery site from the database, the disaster recovery site information comprising disaster recovery hardware;
    creating a list of the production applications in the data center;
    automatically determining a valid list of the production applications from the list of the production applications based on rules in the database;
    creating a list of the production hardware in the data center;
    automatically determining a valid list of the production hardware from the list of production hardware based on the rules in the database, which comprises:
        determining the production hardware on which the valid list of the production applications run; and
        removing the production hardware on which the valid list of the production applications does not run; and
    mapping the valid list of the production hardware to the disaster recovery hardware of the disaster recovery site.

2. The method of claim 1, wherein mapping the valid list of the production hardware to the disaster recovery hardware of the disaster recovery site comprises:
    for a particular piece of production hardware in the valid list of the production hardware, determining a potential group of disaster recovery hardware which potentially matches the particular piece of production hardware;
    determining a mapping score for each of the disaster recovery hardware in the potential group, wherein the mapping score individually indicates how well each of the disaster recovery hardware matches the particular piece of production hardware;
    prioritizing the disaster recovery hardware in the potential group from a highest mapping score to a lowest mapping score;
    automatically selecting the disaster recovery hardware in the potential group having the highest mapping score as a selected disaster recovery hardware; and
    mapping the particular piece of production hardware to the selected disaster recovery hardware having the highest mapping score.

3. The method of claim 2, further comprising removing the selected disaster recovery hardware from a pool of available disaster recovery hardware such that the selected disaster recovery hardware is unavailable to be mapped to.

4. The method of claim 2, wherein determining the mapping score for each of the disaster recovery hardware in the potential group comprises:
    obtaining a model number for the piece of production hardware;
    constructing the potential group of disaster recovery hardware at least one of based on the potential group matching the model number and based on the potential group having an equivalent to the model number; and
    to compute the mapping score for each of the disaster recovery hardware which indicates how well each of the disaster recovery hardware matches the particular piece of production hardware, determining a score for model type match, determining a score for number of central processing units (CPUs) match, determining a score for a speed of the central processing units, and determining a score for an amount of memory match.

5. The method of claim 4, further comprising to compute the mapping score for each of the disaster recovery hardware in the potential group, giving more weight for a piece of disaster recovery hardware in the potential group exactly matching the model number than for having the equivalent to the model number.

6. The method of claim 1, wherein automatically determining the valid list of the production applications from the list of the production applications based on rules in the database comprises:
    removing the production applications that are not to be mapped; and
    prioritizing the production applications to have a ranking order of importance in the valid list of the production applications.

7. The method of claim 6, further comprising mapping the production hardware to the disaster recovery hardware in the importance of the ranking order of the production applications, such that the production hardware corresponding to a higher ranking order is mapped prior to production hardware corresponding to a lower ranking order.

8. The method of claim 7, wherein when a pool of available disaster recovery hardware is empty, assuring that the production hardware corresponding to the higher ranking order is mapped while not mapping production hardware corresponding to the lower ranking order.

9. The method of claim 1, further comprising displaying a total number of mapped production hardware and a total number of gapped production hardware, wherein the gapped production hardware could not be mapped to the disaster recovery hardware.

10. The method of claim 1, further comprising displaying a total number of failed production application rules and a total number of failed of production hardware rules.

11. The method of claim 1, wherein the rules of the database comprise at least one of: map in-scope production applications only; map only specified recovery priorities, wherein the production applications are assigned recovery priorities based on a criticality of business processes that are supported; do not map the production applications architected with automatic failover; do not map the production applications having dedicated disaster recovery hardware; and do not map the production applications having a deferral from mapping.

12. The method of claim 1, wherein the rules of the database comprise at least one of: map using mapping history first, wherein the mapping history is utilized such that what has been mapped in the past can be reused without having to remap; gap all production hardware that cannot be mapped to disaster recovery hardware wherein gap is an indication of an inability to be mapped; only map a first of an entire group of production hardware for a particular production application, when the particular production application is supported by the entire group; only map the production applications given; do not map identified production applications marked as excluded;

reset a pool of available disaster recovery hardware after mapping each production application; and reset the pool of available disaster recovery hardware after mapping for each data center location when mapping across multiple data centers.

13. A computer, comprising:

memory for storing a program for mapping a data center to a disaster recovery site; and a processor, functionally coupled to the memory, the processor being responsive to computer-executable instructions contained in the program and operative for:

retrieving data center information for the data center from a database, the data center information comprising production hardware and production applications;

retrieving disaster recovery site information for the disaster recovery site from the database, the disaster recovery site information comprising disaster recovery hardware;

creating a list of the production applications in the data center;

automatically determining a valid list of the production applications from the list of the production applications based on rules in the database;

creating a list of the production hardware in the data center;

automatically determining a valid list of the production hardware from the list of production hardware based on the rules in the database, which comprises:

determining the production hardware on which the valid list of the production applications run; and removing the production hardware on which the valid list of the production applications does not run; and mapping the valid list of the production hardware to the disaster recovery hardware of the disaster recovery site.

14. The computer of claim 13, wherein mapping the valid list of the production hardware to the disaster recovery hardware of the disaster recovery site comprises:

for a particular piece of production hardware in the valid list of the production hardware, determining a potential group of disaster recovery hardware which potentially matches the particular piece of production hardware;

determining a mapping score for each of the disaster recovery hardware in the potential group, wherein the mapping score individually indicates how well each of the disaster recovery hardware matches the particular piece of production hardware;

prioritizing the disaster recovery hardware in the potential group from a highest mapping score to a lowest mapping score;

automatically selecting the disaster recovery hardware in the potential group having the highest mapping score as a selected disaster recovery hardware; and mapping the particular piece of production hardware to the selected disaster recovery hardware having the highest mapping score.

15. The computer of claim 14, further comprising the processor is operative for removing the selected disaster recovery hardware from a pool of available disaster recovery hardware such that the selected disaster recovery hardware is unavailable to be mapped to.

16. The computer of claim 14, wherein determining the mapping score for each of the disaster recovery hardware in the potential group comprises:

obtaining a model number for the piece of production hardware;

constructing the potential group of disaster recovery hardware at least one of based on the potential group matching the model number and based on the potential group having an equivalent to the model number; and to compute the mapping score for each of the disaster recovery hardware which indicates how well each of the disaster recovery hardware matches the particular piece of production hardware, determining a score for model type match, determining a score for number of central processing units (CPUs) match, determining a score for a speed of the central processing units, and determining a score for an amount of memory match.

17. The computer of claim 16, further comprising to compute the mapping score for each of the disaster recovery hardware in the potential group, the processor is operative for giving more weight for a piece of disaster recovery hardware in the potential group exactly matching the model number than for having the equivalent to the model number.

18. The computer of claim 14, wherein automatically determining the valid list of the production applications from the list of the production applications based on rules in the database comprises:

removing the production applications that are not to be mapped; and prioritizing the production applications to have a ranking order of importance in the valid list of the production applications.

19. The computer of claim 18, further comprising the processor is operative for mapping the production hardware to the disaster recovery hardware in the importance of the ranking order of the production applications, such that the production hardware corresponding to a higher ranking order is mapped prior to production hardware corresponding to a lower ranking order.

20. A computer program product, tangibly embodied on a non-transitory computer readable medium, the computer program product including instructions for causing a computer to execute a method for mapping a data center to a disaster recovery site, comprising:

retrieving data center information for the data center from a database, the data center information comprising production hardware and production applications;

retrieving disaster recovery site information for the disaster recovery site from the database, the disaster recovery site information comprising disaster recovery hardware;

creating a list of the production applications in the data center;

automatically determining a valid list of the production applications from the list of the production applications based on rules in the database;

creating a list of the production hardware in the data center;

automatically determining a valid list of the production hardware from the list of production hardware based on the rules in the database, which comprises:

determining the production hardware on which the valid list of the production applications run; and removing the production hardware on which the valid list of the production applications does not run; and mapping the valid list of the production hardware to the disaster recovery hardware of the disaster recovery site.

* * * * *